United States Patent
Nakasugi et al.

(10) Patent No.: US 6,326,051 B1
(45) Date of Patent: *Dec. 4, 2001

(54) PROCESS FOR PREPARING A NOURISHING COMPOSITIONS FOR ANIMALS

(75) Inventors: Shigeru Nakasugi, Tokyo; Kenjiro Shimada; Koji Morishita, both of Ibaraki, all of (JP)

(73) Assignee: Kyowa Hakko Kogyo Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,018

(22) Filed: Nov. 17, 1997

Related U.S. Application Data

(63) Continuation of application No. 08/535,879, filed on Nov. 8, 1995, now abandoned, which is a continuation-in-part of application No. 08/362,934, filed on Dec. 23, 1994, now abandoned.

(30) Foreign Application Priority Data

Dec. 28, 1993 (JP) .................................................... 5-334223

(51) Int. Cl.⁷ ........................................................ A23K 1/00
(52) U.S. Cl. ............................................. 426/656; 426/661
(58) Field of Search ............................... 426/2, 656, 658, 426/661

(56) References Cited

U.S. PATENT DOCUMENTS

| 4,144,357 | * | 3/1979 | Mohammed | 426/656 X |
| 4,547,377 | * | 10/1985 | Ogawa et al. | 426/656 X |

OTHER PUBLICATIONS

Falbe et al Rompp Chemic Lexikon 9 Ed. Jan. 1, 1990 Georg Thieme Verlag, Stuttgart.
Belitz et al Lehrbuch der Lebensmittelchemie Jan. 1, 1985, Springer Verlag, Berlin.

* cited by examiner

*Primary Examiner*—Arthur L. Corbin
(74) *Attorney, Agent, or Firm*—Nixon & Vanderhye

(57) ABSTRACT

A nourishing composition for animals according to the present invention comprises dextrin and at least one amino acid. When given to animals as a drink, the nourishing composition for animals can improve the nutritional conditions of the animals without causing browning in the aqueous solution.

5 Claims, 1 Drawing Sheet

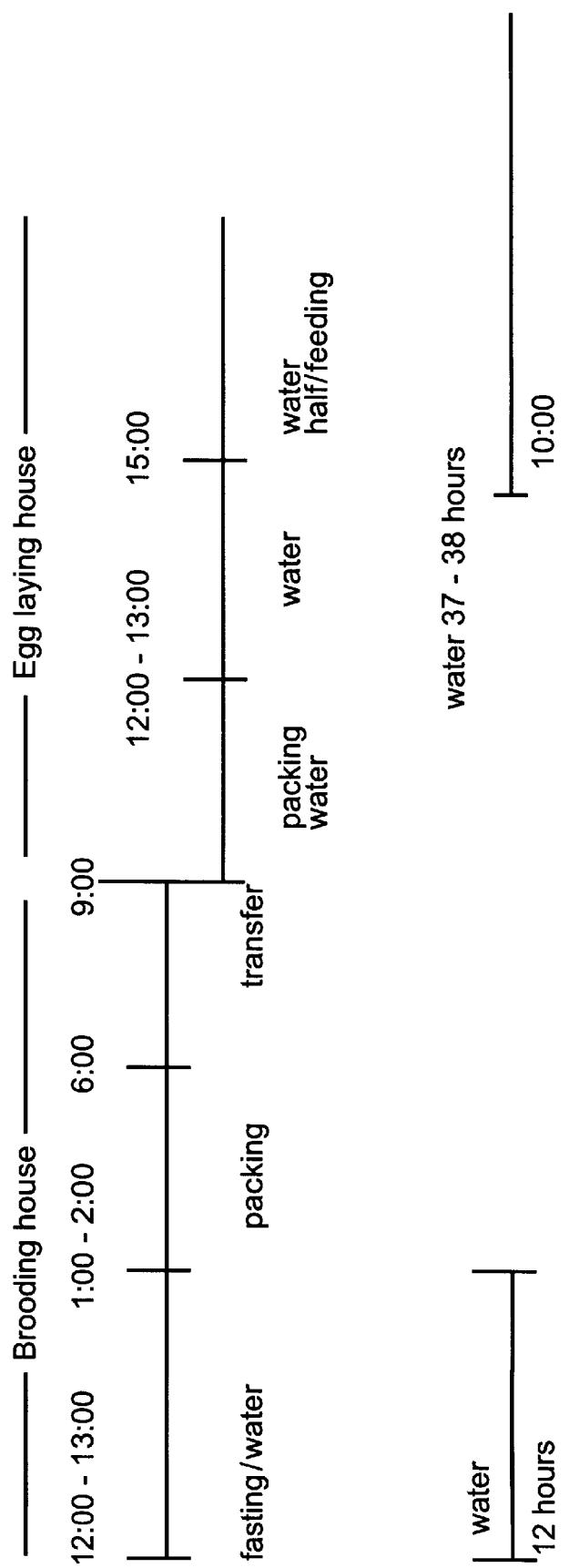

PROCESS FOR PREPARING A NOURISHING COMPOSITIONS FOR ANIMALS

CROSS-REFERENCES TO RELATED APPLICATIONS

This application is a continuation of earlier application Ser. No. 08/535,879 filed Nov. 8, 1995, abandoned, which, in turn, is a continuation-in-part of application Ser. No. 08/362,934 filed Dec. 23, 1994, abandoned.

FIELD OF THE INVENTION

This invention relates to a nourishing composition for animals which is useful in improving the nutritional conditions of animals when given together with drinking water.

BACKGROUND OF THE INVENTION

In summer, domestic animals generally drink much water but show decreased appetite, which causes various problems, for example, in the case of pig etc., stagnation in body weight gain and reduction of mating performance, in the case of broiler etc., stagnation in body weight gain, in the case of layer etc., reduction of egg laying performance, decrease in egg shell strength and increase in the ratio of soft/broken shell eggs.

Further, problems such as stagnation in body weight gain may occur at the time of the shipment of broilers, the transfer of large layer chicks, the debeaking of layers, forced moulting of layers, the change of the feed for layers or broilers, the first feeding of the new-born layers or broilers, vaccination of layers or broilers, farrowing and weaning of piglings and the shipment of mother pigs.

To prevent these problems, attempts have been made to add nutritional components such as amino acids to feeds to thereby improve the nutritional conditions of domestic animals.

Even if nutritional components such as amino acids are added to feeds, however, the decreased appetite makes it impossible to achieve the desired effects.

In addition, feed remaining in the digestive organs of pork type pigs, broilers etc. at dressing contravenes the Food Hygiene Law. It is therefore necessary to omit feed and give only water to domestic animals from the day before shipment.

Accordingly, it is expected that when nutritional components including amino acids are added to drinking water, then the nutritional conditions of domestic animals can be maintained or improved even though they show decreased appetite or are fasting.

JP-A-2-255047 has proposed a method for improving the amino acid uptake of an animal by orally administering a liquid composition comprising amino acids together with other nutritional components, for example, carbohydrates, vitamins, minerals and enzymes (the term "JP-A" as used herein means an "unexamined published Japanese patent application").

However, the composition disclosed in the above publication suffers from several disadvantages, for example that a sufficient amount of amino acids can be hardly dissolved in the composition and that glucose, which is one of the carbohydrates employed as an additive, undergoes aminocarbonylation with the amino acids in an aqueous solution resulting in browning or solidification of the feed aqueous solution. U.S. Pat. No. 5,296,243 discloses a method using sugar alcohol in place of sugar, but a more effective nourishing method has been desired.

SUMMARY OF THE INVENTION

The present invention aims at providing a nourishing composition for animals containing dextrin and at least one amino acid where the amino acids are dissolved in a sufficient amount and never undergo aminocarbonylation even though the composition is formulated into an aqueous solution. The present invention also aims at providing a method of nourishing animals which comprises feeding animals said composition.

Accordingly, the present invention relates to a method of nourishing animals which comprises dissolving a solid composition containing dextrin and at least one amino acid in water and feeding animals the resulting composition as a drink. The present invention also relates to a solid nourishing composition for animals which comprises dextrin and at least one amino acid for use in the above method and an aqueous nourishing composition prepared by dissolving the above solid composition in water (both compositions are hereinafter collectively referred to as a nourishing composition).

BRIEF DESCRIPTION OF THE DRAWING

FIG. 1 shows an operation schedule for transferring large layer chicks.

DETAILED DESCRIPTION OF THE INVENTION

As the dextrin, those having a degree of polymerization ranging from 3 to 30, preferably from 5 to 25, may be used.

The amino acid (or acids) used in the present invention is not particularly restricted, so long as it is one required by animals. It is preferable to use at least one essential amino acid such as lysine, methionine, tryptophan, threonine, alanine, glycine and glutamic acid. It is particularly preferable to use an amino acid mixture containing lysine, methionine, tryptophan, threonine, alanine and glycine, more preferable to use a mixture containing lysine, methionine, tryptophan, threonine and glycine.

A mixing ratio of dextrin to amino acid in the solid nourishing composition ranges from 8:1 to 1:8, preferably from 3:1 to 1:2. The mixing ratio is more preferably 2:1, most preferably 20:32.

The aqueous composition can be prepared by dissolving the solid composition in 10 to 7,000 times, preferably 10 to 200 times, as much water as the weight of the composition.

The amino acid content in the aqueous nourishing composition for animals according to the present invention ranges from 0.001 to 5.0% by weight, preferably from 0.003 to 2.0% by weight (dry basis). For example, the contents of lysine, methionine, tryptophan, threonine, glutamic acid, glycine and alanine preferably range respectively from 0.002 to 2.0% by weight, from 0.003 to 0.8% by weight, from 0.001 to 0.3% by weight, from 0.001 to 0.4% by weight, from 0.005 to 2.0% by weight, from 0.005 to 2.0% by weight and from 0.005 to 2.0% by weight. The content of dextrin ranges from 0.0005 to 10.0% by weight, preferably 0.001 to 0.8% by weight.

The solid nourishing composition or the aqueous nourishing composition for animals of the present invention may contain additional components such as dissolution aids, dispersing agents, stabilizers, preservatives, antibiotics and antioxidants. Also, it may contain proteinous materials such as soluble soybean protein, soluble fish protein, soluble gelatin and defatted milk powder, organic acids such as citric acid, malic acid and succinic acid, vitamins, minerals, ethyl alcohol, colorants and perfumes. It is preferable to use organic acids from among these additives, since they exhibit a buffering action in the solution, improve the appetite and play a role as a metabolite in the TCA cycle in vivo so as to serve as an energy source.

The solid nourishing composition for animals according to the present invention can be produced by mixing amino acid powder with dextrin. If necessary, additives such as dissolution aids as described above may be added.

The aqueous nourishing composition can be prepared by dissolving the solid nourishing composition obtained as described above in 10 to 7,000 times, preferably 10 to 200 times, as much water as the weight of the composition. If necessary, stabilizers may be added.

The particle size (diameter) of the amino acids to be used in the formulation ranges from 1.0 to 1000 μm, preferably from 1.0 to 500 μm. For example, the particle sizes of lysine, methionine, tryptophan, threonine, glutamic acid, glycine and alanine preferably range respectively from 1.0 to 500 μm, from 1.0 to 200 μm, from 1.0 to 200 μm, from 1.0 to 500 μm, from 1.0 to 500 μm, from 1.0 to 500 μm and from 1.0 to 500 μm. It is preferable that the dissolution or suspending is carried out immediately before use.

The nourishing composition for animals of the present invention may be given to, for example, poultry such as layer and broiler, monogastric animals such as pig and ruminants such as cattle and sheep. The nourishing composition for animals of the present invention may be given to the animals ad libitum. Alternately, it may be orally given to them by force. The dose may range from 10 to 1,000 mg/kg/day in terms of amino acids and from 5 to 1,000 mg/kg/day in terms of dextrin. The compositions of the invention may be given as a single or divided administration.

Although the nourishing composition for animals according to the present invention is in the form of an aqueous solution, it never causes aminocarbonylation between sugars and amino acids and the aqueous solution undergoes neither browning nor solidification. Thus the nourishing composition for animals of the present invention makes it possible to increase amino acid uptake thus improving the nutritional conditions of animals.

The nourishing composition for animals of the present invention is useful for preventing various unfavorable conditions, such as stagnation in body weight gain, reduction of egg laying performance or decrease in egg shell strength, resulted from loss of appetite caused by stress at the time of the shipment of broilers, the transfer of large layer chicks, the debeaking of layers, forced moulting of layers, feeding layers or broilers during the summer season, the change of the feed for layers or broilers, the first feeding of the new-born layers or broilers, vaccination of layers or broilers, farrowing, weaning of piglings and the shipment of mother pigs.

The composition of the present invention is provided in the form of a solid nourishing composition for the convenience of transport. The solid composition is dissolved in water upon use to give an aqueous nourishing composition, which is given to animals as a drink.

Next, working examples and test examples of the present invention will be given, but are not to be construed to limit the scope of the present invention.

Lysine, tryptophan, threonine and glutamic acid employed in the following examples were all L-compounds, while methionine and alanine employed therein were all DL-compounds. As the amino acids to be used in the present invention, mention may be made of D-form, L-form and DL-form.

EXAMPLE 1

Lysine, methionine, threonine, tryptophan, glycine, dextrin (degree of polymerization: 15.1; NSD 300 manufactured by Nippon Shiryo Kogyo Co.) and citric acid were mixed together at each ratio as specified in Table 1 and the resulting mixture was dissolved in 20 l of water. The obtained solution was diluted 15-fold with the use of a proportional liquid dispenser (Dosatron, a product of Dosatron International). Thus nourishing compositions 1, 2 and 3 for animals were obtained.

TABLE 1

| Component | Composition 1 (g) | Composition 2 (g) | Composition 3 (g) |
|---|---|---|---|
| lysine | 40 | 80 | 160 |
| methionine | 15 | 30 | 60 |
| threonine | 20 | 40 | 90 |
| tryptophan | 15 | 30 | 60 |
| glycine | 100 | 200 | 400 |
| dextrin | 300 | 610 | 1230 |
| citric acid | 10 | 10 | 10 |
| total | 500 | 1000 | 2000 |

EXAMPLE 2

Lysine, methionine, threonine, tryptophan, dextrin (degree of polymerization: 15.1; NSD 300 manufactured by Nippon Shiryo Kogyo Co.), citric acid and vitamins were mixed together at each ratio as specified in Table 2 and the resulting mixture was dissolved in 20 l of water. The obtained solution was diluted 15-fold with the use of a proportional liquid dispenser (Dosatron, a product of Dosatron International). Thus nourishing compositions 4, 5 and 6 for animals were obtained. The vitamins used herein was a composition prepared by mixing the vitamins as specified in Table 3 and adding dextrin thereto in such a manner as to give a total amount of 10 g.

TABLE 2

| Component | Composition 4 (g) | Composition 5 (g) | Composition 6 (g) |
|---|---|---|---|
| lysine | 10 | 20 | 40 |
| methionine | 6 | 15 | 25 |
| threonine | 3 | 5 | 10 |
| tryptophan | 1 | 3 | 5 |
| dextrin | 10 | 17 | 20 |
| citric acid | 5 | 10 | 10 |
| vitamin | 10 | 10 | 10 |
| total | 45 | 80 | 120 |

TABLE 3

| Compound | Content (mg) | Compound | Content (mg) |
|---|---|---|---|
| thiamine | 50.0 | biotin | 2.0 |
| riboflavin | 100.0 | choline | 9000.0 |
| pantothenic acid | 200.00 | folic acid | 10.0 |
| nicotinic acid | 200.0 | vitamin $B_{12}$ | 0.2 |
| vitamin $B_6$ | 40.0 | linoleic acid | 20.0 |

EXAMPLE 3

Lysine, methionine, threonine, tryptophan, dextrin (degree of polymerization: 15.1; NSD 300 manufactured by Nippon Shiryo Kogyo Co.), citric acid and vitamins were mixed together at each ratio as specified in Table 4 and the resulting mixture was dissolved in 30 l of water. The obtained solution was diluted 10-fold with the use of a proportional liquid dispenser (Dosatron, a product of Dosatron International). Thus nourishing compositions 7 and 8 for animals were obtained. The vitamins used herein was a composition prepared by mixing the vitamins as specified in Table 5 and adding dextrin thereto to give a total amount of 10 g.

TABLE 4

| Component | Composition 7 (g) | Composition 8 (g) |
| --- | --- | --- |
| lysine | 10 | 30 |
| methionine | 30 | 65 |
| threonine | 5 | 10 |
| tryptophan | 10 | 30 |
| dextrin | 35 | 45 |
| citric acid | 10 | 10 |
| vitamin | 10 | 10 |
| total | 120 | 200 |

TABLE 5

| Compound | Content (mg) | Compound | Content (mg) |
| --- | --- | --- | --- |
| thiamine | 80.0 | biotin | 10.0 |
| riboflavin | 220.0 | choline | 8000.0 |
| pantothenic acid | 220.0 | folic acid | 2.5 |
| nicotinic acid | 1000.0 | vitamin $B_{12}$ | 0.3 |
| vitamin $B_6$ | 300.0 | linoleic acid | 10.0 |

EXAMPLE 4

Lysine, methionine, threonine, tryptophan, glycine, dextrin (degree of polymerization: 15.1; NSD 300 manufactured by Nippon Shiryo Kogyo Co.), citric acid and vitamins were mixed together at each ratio as specified in Table 6 and the resulting mixture was dissolved in 20 l of water. The obtained solution was diluted 10-fold with the use of a proportional liquid dispenser (Dosatron, a product of Dosatron International). Thus nourishing compositions 9 to 11 for animals were obtained. The vitamins used herein was prepared by mixing the vitamins as specified in Table 7 and adding dextrin thereto to give a total amount of 10 g.

TABLE 6

| Component | Composition 9 (g) | Composition 10 (g) | Composition 11 (g) |
| --- | --- | --- | --- |
| lysine | 15 | 30 | 60 |
| methionine | 10 | 20 | 40 |
| threonine | 10 | 20 | 40 |
| tryptophan | 3 | 5 | 10 |
| glycine | 40 | 75 | 150 |
| dextrin | 102 | 230 | 480 |
| citric acid | 10 | 10 | 10 |
| vitamin | 10 | 10 | 10 |
| total | 200 | 400 | 800 |

TABLE 7

| Compound | Content (mg) | Compound | Content (mg) |
| --- | --- | --- | --- |
| thiamine | 260.0 | biotin | 20.0 |
| riboflavin | 360.0 | choline | 4000.0 |
| pantothenic acid | 2000.0 | folic acid | 50.0 |
| nicotinic acid | 2200.0 | vitamin $B_{12}$ | 1.0 |
| vitamin $B_6$ | 600.0 | linoleic acid | 160.0 |

EXAMPLE 5

Lysine, methionine, threonine, tryptophan, glycine, dextrin (degree of polymerization: 15.1; NSD 300 manufactured by Nippon Shiryo Kogyo Co.), citric acid and vitamins were mixed together at each ratio as specified in Table 8 and the resulting mixture was dissolved in 20 l of water. The obtained solution was diluted 10-fold with the use of a proportional liquid dispenser (Dosatron, a product of Dosatron International). Thus nourishing compositions 12 to 14 for animals were obtained. The vitamins used herein was prepared by mixing the vitamins as specified in Table 9 and adding dextrin thereto to give a total amount of 10 g.

TABLE 8

| Component | Composition 12 (g) | Composition 13 (g) | Composition 14 (g) |
| --- | --- | --- | --- |
| lysine | 30 | 60 | 120 |
| methionine | 20 | 40 | 80 |
| threonine | 20 | 40 | 80 |
| tryptophan | 5 | 10 | 20 |
| glycine | 75 | 150 | 300 |
| dextrin | 230 | 480 | 980 |
| citric acid | 10 | 10 | 10 |
| vitamin | 10 | 10 | 10 |
| total | 400 | 800 | 1600 |

TABLE 9

| Compound | Content (mg) | Compound | Content (mg) |
| --- | --- | --- | --- |
| thiamine | 80.0 | biotin | 10.0 |
| riboflavin | 220.0 | choline | 7500.0 |
| pantothenic acid | 220.0 | folic acid | 2.5 |
| nicotinic acid | 1000.0 | vitamin $B_{12}$ | 0.3 |
| vitamin $B_6$ | 300.0 | linoleic acid | 100.0 |

EXAMPLE 6

Lysine, methionine, threonine, tryptophan, glycine, dextrin (degree of polymerization: 15.1; NSD 300 manufactured by Nippon Shiryo Kogyo Co.), citric acid and vitamins were mixed together at each ratio as specified in Table 10 and the resulting mixture was dissolved in 20 l of water. Thus, nourishing compositions 15 to 17 for animals were obtained. The vitamins used herein was prepared by mixing the vitamins as specified in Table 11 and adding dextrin thereto to give a total amount of 2 g.

TABLE 10

| Component | Composition 15 (g) | Composition 16 (g) | Composition 17 (g) |
|---|---|---|---|
| lysine | 4 | 8 | 16 |
| methionine | 2 | 4 | 8 |
| threonine | 3 | 6 | 12 |
| tryptophan | 1 | 2 | 4 |
| glycine | 2 | 4 | 8 |
| dextrin | 34 | 72 | 148 |
| citric acid | 2 | 2 | 2 |
| vitamin | 2 | 2 | 2 |
| total | 50 | 100 | 200 |

TABLE 11

| Compound | Content (mg) | Compound | Content (mg) |
|---|---|---|---|
| thiamine | 1.0 | biotin | 0.2 |
| riboflavin | 3.75 | choline | 1250.0 |
| pantothenic acid | 12.0 | folic acid | 0.3 |
| nicotinic acid | 10.0 | vitamin $B_{12}$ | 0.02 |
| vitamin $B_6$ | 1.0 | | |

EXAMPLE 7

Lysine, methionine, threonine, tryptophan, dextrin (degree of polymerization: 15.1; NSD 300 manufactured by Nippon Shiryo Kogyo Co.), citric acid and vitamins were mixed together at each ratio as specified in Table 12 and the resulting mixture was dissolved in 20 l of water. The obtained solution was diluted 2-fold with the use of a proportional liquid dispenser (Dosatron, a product of Dosatron International). Thus nourishing compositions 18 to 20 for animals were obtained. The vitamins used herein was prepared by mixing the vitamins as specified in Table 13 and adding dextrin thereto to give a total amount of 1 g.

TABLE 12

| Component | Composition 18 (g) | Composition 19 (g) | Composition 20 (g) |
|---|---|---|---|
| lysine | 4.5 | 9.00 | 18.0 |
| methionine | 2.2 | 4.5 | 9.0 |
| threonine | 2.6 | 5.2 | 10.5 |
| tryptophan | 0.8 | 1.6 | 3.2 |
| dextrin | 2.9 | 2.7 | 7.3 |
| citric acid | 1.0 | 1.0 | 1.0 |
| vitamin | 1.0 | 1.0 | 1.0 |
| total | 15.0 | 25.0 | 50.0 |

TABLE 13

| Compound | Content (mg) | Compound | Content (mg) |
|---|---|---|---|
| thiamine | 10.5 | biotin | 0.5 |
| riboflavin | 31.6 | choline | 4200.0 |
| pantothenic acid | 95.0 | folic acid | 3.2 |
| nicotinic acid | 130.2 | vitamin $B_{12}$ | 0.2 |
| vitamin $B_6$ | 15.8 | | |

EXAMPLE 8

Lysine, methionine, threonine, tryptophan, glycine, dextrin (degree of polymerization: 15.1; NSD 300 manufactured by Nippon Shiryo Kogyo Co.) and citric acid were mixed together at each ratio as specified in Table 14 and the resulting mixture was dissolved in 10 l of water. The obtained solution was diluted 10-fold with the use of a proportional liquid dispenser (Dosatron, a product of Dosatron International). Thus nourishing compositions 21 to 23 for animals were obtained.

TABLE 14

| Component | Composition 21 (g) | Composition 22 (g) | Composition 23 (g) |
|---|---|---|---|
| lysine | 10 | 13 | 15 |
| methionine | 5 | 6.5 | 8 |
| threonine | 7 | 8 | 9 |
| tryptophan | 2 | 2.5 | 3 |
| glycine | 20 | 25 | 30 |
| dextrin | 146 | 235 | 325 |
| citric acid | 10 | 10 | 10 |
| total | 200 | 300 | 400 |

EXAMPLE 9

Lysine, methionine, threonine, tryptophan, glycine, glucose, fructose, dextrin (degree of polymerization: 15.1; NSD 300 manufactured by Nippon Shiryo Kogyo Co.) and citric acid were mixed together at each ratio as specified in Table 15 and the resulting mixture was dissolved in 1 l of water. Thus nourishing compositions 24 to 27 for animals were obtained.

TABLE 15

| Component | Composition 24 (g) | Composition 25 (g) | Composition 26 (g) | Composition 27 (g) |
|---|---|---|---|---|
| lysine | 0.16 | 0.16 | 0.16 | 0.16 |
| methionine | 0.06 | 0.06 | 0.06 | 0.06 |
| threonine | 0.06 | 0.06 | 0.06 | 0.06 |
| tryptophan | 0.11 | 0.11 | 0.11 | 0.11 |
| glycine | 0.10 | 0.10 | 0.10 | 0.10 |
| glucose | 0.50 | — | — | 0.40 |
| fructose | — | 0.50 | — | — |
| dextrin | — | — | 0.50 | — |
| citric acid | 0.01 | 0.01 | 0.01 | 0.01 |

EXAMPLE 10

Lysine, methionine, threonine, tryptophan, sorbitol citric acid and vitamins were mixed together at each ratio as specified in Table 16 and the resulting mixture was dissolved in 20 l of water. The obtained solution was diluted 15-fold with the use of a proportional liquid dispenser (Dosatron, a product of Dosatron International). Thus nourishing compositions 28 and 29 for animals were obtained. The vitamins used herein was a composition prepared by mixing the vitamins as specified in Table 3 above and adding sorbitol thereto in such a manner as to give a total amount of 10 g.

TABLE 16

| Component | Composition 28 (g) | Composition 29 (g) |
|---|---|---|
| lysine | 30 | 60 |
| methionine | 15 | 30 |
| threonine | 15 | 30 |
| tryptophan | 5 | 10 |
| sorbitol | 10 | 20 |

TABLE 16-continued

| Component | Composition 28 (g) | Composition 29 (g) |
|---|---|---|
| citric acid | 10 | 20 |
| vitamin | 5 | 10 |
| total | 90 | 180 |

EXAMPLE 11

Lysine, methionine, threonine, tryptophan, sorbitol, citric acid and vitamins were mixed together at each ratio as specified in Table 17 and the resulting mixture was dissolved in 10 l of water. The obtained solution was diluted 10-fold with the use of a proportional liquid dispenser (Dosatron, a product of Dosatron International). Thus nourishing compositions 30 and 31 for animals were obtained. The vitamins used herein was a composition prepared by mixing the vitamins as specified in Table 18 and adding sorbitol thereto to give a total amount of 10 g.

TABLE 17

| Component | Composition 30 (g) | Composition 31 (g) |
|---|---|---|
| lysine | 10 | 20 |
| methionine | 5 | 10 |
| threonine | 5 | 10 |
| tryptophan | 2.5 | 5 |
| sorbitol | 12.5 | 25 |
| citric acid | 2.5 | 5 |
| vitamin | 2.5 | 5 |
| total | 40 | 80 |

TABLE 18

| Compound | Content (mg) | Compound | Content (mg) |
|---|---|---|---|
| thiamine | 15.0 | biotin | 0.5 |
| riboflavin | 25.0 | choline | 1500.0 |
| pantothenic acid | 50.0 | folic acid | 2.5 |
| nicotinic acid | 50.0 | vitamin $B_{12}$ | 0.1 |
| vitamin $B_6$ | 10.0 | linoleic acid | 5.0 |

EXAMPLE 12

Lysine, methionine, threonine, tryptophan, dextrin (degree of polymerization: 15.1; NSD 300 manufactured by Nippon Shiryo Kogyo Co.) citric acid and vitamins were mixed together at each ratio as specified in Table 19 and the resulting mixture was dissolved in 30 l of water. The obtained solution was diluted 10-fold with the use of a proportional liquid dispenser (Dosatron, a product of Dosatron International). Thus nourishing compositions 32 and 33 for animals were obtained. The vitamins used herein was prepared by mixing the vitamins as specified in Table 5 above and adding dextrin thereto to give a total amount of 10 g.

TABLE 19

| Component | Composition 32 (g) | Composition 33 (g) |
|---|---|---|
| lysine | 20 | 30 |
| methionine | 30 | 65 |
| threonine | 5 | 10 |
| tryptophan | 10 | 30 |
| dextrin | 35 | 45 |
| citric acid | 10 | 10 |
| vitamin | 10 | 10 |
| total | 120 | 200 |

EXAMPLE 13

Lysine, methionine, threonine, tryptophan, dextrin (degree of polymerization: 15.1; NSD 300 manufactured by Nippon Shiryo Kogyo Co.), citric acid and vitamins were mixed together at each ratio as specified in Table 20 and the resulting mixture was dissolved in 20 l of water. The obtained solution was diluted 15-fold with the use of a proportional liquid dispenser (Dosatron, a product of Dosatron International). Thus nourishing composition 34 for animals were obtained. The vitamins used herein was prepared by mixing the vitamins as specified in Table 3 above and adding dextrin thereto to give a total amount of 10 g.

TABLE 20

| Component | Composition 34 (g) |
|---|---|
| lysine | 60 |
| methionine | 30 |
| threonine | 30 |
| tryptophan | 10 |
| dextrin | 20 |
| citric acid | 20 |
| vitamin | 10 |
| total | 180 |

EXAMPLE 14

Lysine, methionine, threonine, tryptophan, dextrin (degree of polymerization: 15.1; NSD 300 manufactured by Nippon Shiryo Kogyo Co.), citric acid and vitamins were mixed together at each ratio as specified in Table 21 and the resulting mixture was dissolved in 20 l of water. The obtained solution was diluted 10-fold with the use of a proportional liquid dispenser (Dosatron, a product of Dosatron International). Thus nourishing composition 35 for animals was obtained. The vitamins used herein was prepared by mixing the vitamins as specified in Table 22 and adding dextrin thereto to give a total amount of 10 g.

TABLE 21

| Component | Composition 35 (g) |
|---|---|
| lysine | 60 |
| methionine | 40 |
| threonine | 40 |
| tryptophan | 10 |
| dextrin | 20 |

TABLE 21-continued

| Component | Composition 35 (g) |
|---|---|
| citric acid | 10 |
| vitamin | 10 |
| total | 200 |

TABLE 22

| Compound | Content (mg) | Compound | Content (mg) |
|---|---|---|---|
| thiamine | 260.0 | biotin | 20.0 |
| riboflavin | 360.0 | choline | 9000.0 |
| pantothenic acid | 2000.0 | folic acid | 50.0 |
| nicotinic acid | 2200.0 | vitamin $B_{12}$ | 1.0 |
| vitamin $B_6$ | 600.0 | linoleic acid | 160.0 |

EXAMPLE 15

Lysine, methionine, threonine, tryptophan, glycine, dextrin (degree of polymerization: 15.1; NSD 300 manufactured by Nippon Shiryo Kogyo Co.), citric acid and vitamins were mixed together at each ratio as specified in Table 23 and the resulting mixture was dissolved in 1 liter of water. To the obtained solution was added 20 times as much water as the weight of the solution with the use of a proportional liquid dispenser (Dosatron, a product of Dosatron International). Thus nourishing composition 36 for animals was obtained. The vitamins used herein was a composition prepared by mixing the vitamins as specified in Table 24 and adding dextrin thereto in such a manner as to give a total amount of 2 g.

EXAMPLE 16

Lysine, methionine, threonine, tryptophan, glycine, dextrin (degree of polymerization: 15.1; NSD 300 manufactured by Nippon Shiryo Kogyo Co.), citric acid and vitamins were mixed together at each ratio as specified in Table 23 and the resulting mixture was dissolved in 1 liter of water. To the obtained solution was added 40 times as much water as the weight of the solution with the use of a proportional liquid dispenser (Dosatron, a product of Dosatron International). Thus nourishing composition 37 for animals was obtained. The vitamins used herein was a composition prepared by mixing the vitamins as specified in Table 24 and adding dextrin thereto to give a total amount of 2 g.

TABLE 23

| Component | Compositions 36 and 37 (g) |
|---|---|
| lysine | 10 |
| methionine | 5 |
| threonine | 5 |
| tryptophan | 2 |
| glycine | 8 |
| dextrin | 60 |
| citric acid | 8 |
| vitamin | 2 |

TABLE 24

| Compound | Content (mg) | Compound | Content (mg) |
|---|---|---|---|
| thiamine | 5 | pyridoxine | 5 |
| riboflavin | 10 | biotin | 1 |
| pantothenic acid | 20 | cyanocobalamin | 0.01 |
| nicotinic acid | 20 | folic acid | 2 |

EXAMPLE 17

Lysine, methionine, threonine, tryptophan, glycine, dextrin (degree of polymerization: 15.1; NSD 300 manufactured by Nippon Shiryo Kogyo Co.), citric acid and vitamins were mixed together at each ratio as specified in Table 25 and the resulting mixture was dissolved in 1 liter of water. The obtained solution was diluted 100-fold with the use of a proportional liquid dispenser (Dosatron, a product of Dosatron International). Thus nourishing composition 38 for animals was obtained. The vitamins used herein was prepared by mixing the vitamins as specified in Table 26 and adding dextrin thereto to give a total amount of 5 g.

TABLE 25

| Component | Composition 38 (g) |
|---|---|
| lysine | 10 |
| methionine | 5 |
| threonine | 5 |
| tryptophan | 2 |
| glycine | 10 |
| dextrin | 20 |
| citric acid | 38 |
| vitamin | 5 |

TABLE 26

| Compound | Content (mg) | Compound | Content (mg) |
|---|---|---|---|
| thiamine | 5 | pyridoxine | 20 |
| riboflavin | 12 | biotin | 1 |
| pantothenic acid | 12 | cyanocobalamin | 0.02 |
| nicotinic acid | 60 | folic acid | 2 |

EXAMPLE 18

Lysine, methionine, threonine, tryptophan, glycine, dextrin (degree of polymerization: 15.1; NSD 300 manufactured by Nippon Shiryo Kogyo Co.), citric acid and vitamins were mixed together at each ratio as specified in Table 27 and the resulting mixture was dissolved in 1 liter of water. The obtained solution was diluted 100-fold with the use of a proportional liquid dispenser (Dosatron, a product of Dosatron International). Thus nourishing composition 39 for animals was obtained. The vitamins used herein was prepared by mixing the vitamins as specified in Table 28 and adding dextrin thereto to give a total amount of 5 g.

TABLE 27

| Component | Composition 39 (g) |
|---|---|
| lysine | 5 |
| methionine | 6 |
| threonine | 2 |
| tryptophan | 2 |
| glycine | 10 |
| dextrin | 20 |
| citric acid | 50 |
| vitamin | 5 |

TABLE 28

| Compound | Content (mg) | Compound | Content (mg) |
|---|---|---|---|
| thiamine | 5 | pyridoxine | 20 |
| riboflavin | 12 | biotin | 1 |
| pantothenic acid | 12 | cyanocobalamin | 0.02 |
| nicotinic acid | 60 | folic acid | 2 |

EXAMPLE 19

Lysine, methionine, threonine, tryptophan, glycine, dextrin (degree of polymerization: 15.1; NSD 300 manufactured by Nippon Shiryo Kogyo Co.), citric acid and vitamins were mixed together at each ratio as specified in Table 29 and the resulting mixture was dissolved in 1 liter of water. Thus, nourishing composition 40 for animals was obtained. The vitamins used herein was prepared by mixing the vitamins as specified in Table 30 and adding dextrin thereto to give a total amount of 2 g.

TABLE 29

| Component | Composition 40 (g) |
|---|---|
| lysine | 20 |
| methionine | 8 |
| threonine | 4 |
| tryptophan | 3 |
| glycine | 15 |
| dextrin | 100 |
| citric acid | 40 |
| vitamin | 10 |

TABLE 30

| Compound | Content (mg) | Compound | Content (mg) |
|---|---|---|---|
| thiamine | 10 | pyridoxine | 40 |
| riboflavin | 24 | biotin | 2 |
| pantothenic acid | 24 | cyanocobalamin | 0.04 |
| nicotinic acid | 120 | folic acid | 4 |

Test Example 1

Broilers aged 56 days were divided into 4 groups each having 1,000 birds and fasted for 15 hours and 30 minutes before the shipment. During the fasting period, the nourishing compositions 1 to 3 obtained in Example 1 and water (as a control) were given respectively to the groups.

The average body weight and the number of dead birds of each group were measured at the initiation of the test and after the completion thereof. Thus the body weight loss and mortality were calculated. Table 31 shows the results.

TABLE 31

| | Composition 1 | Composition 2 | Composition 3 | Control |
|---|---|---|---|---|
| Body weight before test (g) | 2958 | 2983 | 2978 | 2977 |
| Body weight after test (g) | 2880 | 2926 | 2940 | 2882 |
| Body weight loss (g) | 78 | 57 | 38 | 95 |
| Body weight loss (%) | 2.63 | 1.91 | 1.27 | 3.19 |
| Mortality (%) | 2.0 | 1.2 | 0.8 | 3.2 |

As Table 31 shows, the nourishing compositions 1 to 3 for animals according to the present invention each suppressed the body weight loss and lowered the mortality, compared with the control.

Test Example 2

When the temperature was high in the summer season, broilers aged 35 days were divided into 4 groups each having 1,000 birds and fed with a common feed for 35 days. During this period, the nourishing compositions 4 to 6 obtained in Example 2 and water (as a control) were given to the birds.

The average body weight and the number of missing (dead) birds were measured at the initiation of the test and after the completion thereof. Thus the raising rate [(number of birds before test−number of missing birds)/number of birds before test], the feed conversion rate (feed intake/body weight gain), the meat productivity [(average body weight/ feed conversion rate)×100] and the broiler production score (PS) were calculated. PS was calculated in accordance with the following formula.

$$PS = \frac{body\ weight\ after\ test \times raising\ rate}{feed\ conversion\ rate \times test\ period\ (days)} \times 100.$$

Table 32 shows the results.

TABLE 32

| | Composition 4 | Composition 5 | Composition 6 | Control |
|---|---|---|---|---|
| No. of missing birds | 15 | 10 | 5 | 20 |
| Raising rate (%) | 98.5 | 99.0 | 99.5 | 98.0 |
| Body weight before test (g) | 663 | 665 | 638 | 668 |
| Body weight after test (g) | 2869 | 2892 | 2955 | 2837 |
| Body weight gain (g) | 2206 | 2227 | 2317 | 2169 |
| Daily body weight gain (g) | 63.0 | 63.6 | 66.2 | 62.0 |
| Feed conversion rate (%) | 2.34 | 2.30 | 2.29 | 2.38 |
| Meat productivity (%) | 123 | 126 | 129 | 119 |
| PS | 215 | 222 | 229 | 209 |

As Table 32 shows, the nourishing compositions 4 to 6 for animals according to the present invention each decreased the number of missing birds and elevated the raising rate, the feed conversion rate and PS, compared with the control.

Test Example 3

When the temperature was high in the summer season, layers aged 30 weeks were divided into 3 groups each having 1,000 birds and fed with a common feed for 8 weeks. During this period, the nourishing compositions 7 and 8 obtained in Example 3 and water (as a control) were given to the birds.

After the completion of the test, the normal egg laying rate, the individual egg weight, the daily egg weight (individual egg weight×normal egg laying rate), the feed intake, the feed conversion rate [(feed intake/daily egg weight)×100] and the soft/broken egg rate were calculated. Also, regarding the egg qualities, the dense albumen height (the height of dense albumen at breaking) and the yolk diameter of each group were measured and thus the Haugt unit (HU) was calculated.

Tables 33 and 34 show the results.

TABLE 33

|  | Composition 7 | Composition 8 | Control |
| --- | --- | --- | --- |
| Normal egg laying rate (%) | 87.8 | 88.8 | 87.3 |
| Individual egg weight (g) | 59.3 | 59.1 | 59.6 |
| Daily egg weight (g) | 52.1 | 52.5 | 52.0 |
| Feed intake (g) | 100.0 | 99.8 | 100.8 |
| Feed conversion rate (%) | 1.92 | 1.90 | 1.94 |
| Soft/broken egg rate (%) | 2.2 | 2.0 | 2.2 |

TABLE 34

|  | Composition 7 | Composition 8 | Control |
| --- | --- | --- | --- |
| Dense albumen height (mm) | 5.58 | 6.28 | 5.52 |
| Yolk diameter (cm) | 4.10 | 4.16 | 4.09 |
| HU | 71.5 | 77.6 | 71.3 |

As the above Tables 33 and 34 show, the nourishing compositions 7 and 8 for animals according to the present invention each elevated the normal egg laying ratio and the daily egg weight and lowered the soft/broken egg ratio, compared with the control. As the results of the examination on the egg qualities, it was found out that the nourishing compositions 7 and 8 of the present invention each elevated the dense albumen height, the yolk diameter and HU.

Test Example 4

Large layer chicks aged 130 days were divided into 4 groups each having 1,000 birds and then transferred in accordance with the working schedule given in FIG. 1. As shown in FIG. 1, the nourishing compositions 9 to 11 for animals obtained in Example 4 and water as a control were administered to the birds with the use of nipple drinkers attached to gauges both in the brooding and egg-laying houses. The feeding was performed for about 12 hours (from the initiation of fasting to bird trapping/packing) in the brooding house and then for about 2 days from the initiation of feeding of water after transferring the chicks into the egg-laying house.

Table 35 shows the body weights before and after the transfer, the body weight loss and the time (days) required for the recovery of the body weight.

TABLE 35

|  | Composition 9 | Composition 10 | Composition 11 | Control |
| --- | --- | --- | --- | --- |
| Body weight before transfer (g) | 1304 | 1299 | 1302 | 1300 |
| Body weight after transfer (g) | 1184 | 1199 | 1220 | 1157 |
| Body weight loss (g) | 120 | 100 | 92 | 133 |
| Body weight loss (%) | 9.2 | 7.7 | 7.1 | 10.2 |
| Recovery time (days) | 4 | 3 | 3 | 5 |

As Table 35 shows, the nourishing compositions 9 to 11 for animals according to the present invention each suppressed the body weight loss and shortened the time required for the recovery of the body weight, compared with the control.

Test Example 5

Layers aged 12 months were divided into 4 groups each having 1,000 birds. After fasting for 15 days in order to force the bird to moult, water was also not given for 1 day to stress them. Five to 7 days after the initiation of fasting, small feathers fell out. After 10 to 13 days, feathers in the main wings fell out too. After 2 weeks from the initiation of fasting, feeding was initiated. For 3 weeks following the initiation of feeding, the nourishing compositions 12 to 14 for animals obtained in Example 5 and water (as a control) were given to the birds.

Table 36 shows the time (days) required for starting normal egg-laying again after the initiation of feeding (egg-laying starting day after resumption of feeding), the time (days) required for an egg-laying rate achieving 50% of that before moulting (day achieving 50% egg-laying) and the egg-laying peak (the maximum egg-laying rate) of each group.

TABLE 36

|  | Composition 12 | Composition 13 | Composition 14 | Control |
| --- | --- | --- | --- | --- |
| Egg-laying starting day after resuinption of feeding (days) | 10 | 10 | 9 | 11 |
| Day achieving 50% egg-laying rate | 31 | 30 | 30 | 33 |
| Egg-laying peak (Z) | 83 | 85 | 85 | 82 |

As Table 36 shows, the nourishing compositions 12 to 14 for animals according to the present invention each shortened the time required for starting egg-laying again and the time required for an egg-laying rate achieving 50% of that before moulting and improved the egg-laying peak, compared with the control.

Test Example 6

Mother pigs with the third farrowing were divided into 4 groups each having 5 animals. From 5 to 7 days before farrowing to 3 weeks thereafter, the nourishing compositions 15 to 17 for animals obtained in Example 6 and water (as a control) were given respectively to the groups.

The days with puerperal fever of 41° C. or above, the maximum body temperature, the number of piglings, the number of piglings with diarrhea, the number of weanlings and the average body weight at weaning of each group were measured. Table 37 shows the results.

TABLE 37

|  | Composition 15 | Composition 16 | Composition 17 | Control |
|---|---|---|---|---|
| Days with puerperal fever of 41° C. or above | 2 | 0 | 0 | 3 |
| Maximum body temp. (° C.) | 41.7 | 40.7 | 40.5 | 42.2 |
| No. of piglings | 53 | 52 | 54 | 54 |
| No. of piglings with diarrhea | 9 | 6 | 4 | 12 |
| No. of weanlings | 47 | 48 | 50 | 47 |
| Average body weight at weaning (kg) | 6.8 | 7.0 | 7.2 | 6.4 |

As Table 37 shows, the nourishing compositions 15 to 17 for animals according to the present invention each improved the days with puerperal fever of 41° C. or above, the maximum body temperature, the number of piglings, the number of piglings with diarrhea, the number of weanlings and the average body weight at weaning, compared with the control.

Test Example 7

Piglings farrowed by mother pigs of the third farrowing were divided into 4 groups each having 30 animals. For 40 days starting from 10 days before weaning to 30 days after weaning, the nourishing compositions 18 to 20 for animals obtained in Example 7 and water (as a control) were given respectively to the groups.

The body weight at weaning, the body weight 30 days after weaning, the body weight gain and the average feed intake of each group were measured and the feed conversion rate was calculated. Table 38 shows the results.

TABLE 38

|  | Composition 18 | Composition 19 | Composition 20 | Control |
|---|---|---|---|---|
| Body weight at weaning (kg) | 7.1 | 7.1 | 7.1 | 7.1 |
| Body weight 30 days after weaning (kg) | 25.6 | 26.2 | 26.4 | 24.9 |
| Body weight gain (kg) | 18.5 | 19.1 | 19.3 | 17.8 |
| Average feed intake (kg) | 31.6 | 32.3 | 32.4 | 30.6 |
| Feed conversion rate (%) | 1.71 | 1.69 | 1.68 | 1.72 |

As Table 38 shows, groups fed with the nourishing compositions 18 to 20 for animals of the present invention showed each a large body weight gain after weaning and a decrease in the feed conversion rate, compared with the control.

Test Example 8

Hogs aged 105 days and weighing 110 kg were divided into 4 groups each having 20 animals and fasted for 24 hours before the shipment. Simultaneously with the initiation of fasting, the nourishing compositions 21 to 23 for animals obtained in the above Example 8 and water (as a control) were given respectively to the groups.

Each animal was weighed before and after the test to determine the average body weight of animals of each group and the body weight loss was calculated. Table 39 shows the results.

TABLE 39

|  | Composition 21 | Composition 22 | Composition 23 | Control |
|---|---|---|---|---|
| Body weight before test (kg) | 110.0 | 110.0 | 110.0 | 110.0 |
| Body weight after test (kg) | 108.6 | 108.8 | 108.0 | 108.2 |
| Body weight loss | 1.4 | 1.2 | 1.0 | 1.8 |
| Body weight loss (%) | 1.3 | 1.1 | 0.9 | 1.6 |

As Table 39 shows, the groups fed with the nourishing compositions 21 to 23 for animals of the present invention showed each a decreased body weight loss, compared with the control.

Test Example 9

The nourishing compositions 24 to 27 for animals obtained in Example 9 were allowed to stand at 40° C. under a humidity of 75% and the conditions of each solution were observed. Table 40 shows the results.

TABLE 40

| Time | Composition 24 | Composition 25 | Composition 26 | Composition 27 |
|---|---|---|---|---|
| Day 2 | Turning to yellow with forming small masses | Becoming powdery | No change | Turning to yellow with forming large masses |
| Day 5 | Enlarging yellow masses | Becoming coarse | No change | Forming a brown mass as a whole |
| Day 7 | The same as day 5 | The same as day 5 | No change | The same as day 5 |

As Table 40 shows, the nourishing compositions 24, 25 and 27 containing glucose or fructose as a sugar underwent browning. In contrast, the nourishing composition 26 of the present invention containing dextrin as a sugar suffered from no browning even after 7 days.

Test Example 10

Broilers aged 28 days were divided into 3 groups each having 1,000 birds and fed with a common feed for 5 days. During this period, the nourishing compositions 28 and 29 obtained in Example 10 and water (as a control) were given to the birds.

The average body weight and the number of missing dead birds were measured at the initiation of the test (at the age of 28-days) and at the age of 35 and 42 days. Thus the raising rate was calculated in the same manner as in Test Example 2.

Table 41 shows the results.

TABLE 41

|  | Composition 28 | Composition 29 | Control |
|---|---|---|---|
| No. of dead birds | 25 | 20 | 36 |
| Raising rate (Z) | 97.5 | 98.0 | 96.4 |
| Body weight at the age of 28 days (g) | 972 | 967 | 982 |
| Body weight at the age of 35 days (g) | 1400 | 1402 | 1394 |
| Body weight at the age of 42 days (g) | 1798 | 1828 | 1768 |
| Body weight gain (g) | 826 | 861 | 786 |
| Daily body weight gain (g) | 59.0 | 61.5 | 56.1 |

As Table 41 shows, the nourishing compositions 28 and 29 for animals according to the present invention each decreased the number of dead birds and elevated the raising rate, compared with the control.

Test Example 11

Healthy new-born chicks hatched from hatchery eggs laid by breeding hens aged 41 weeks and 44 weeks were divided into 3 groups each having 1,000 birds and fed with the nourishing compositions 30 to 31 obtained in Example 11 and water (as a control) were given to the birds for 7 days.

The average body weight and the number of dead birds were measured at the initiation of the test (at the hatch) and at the age of 7 and 14 days. Thus the raising rate was calculated in the same manner as in Test Example 2.

Table 42 shows the results.

TABLE 42

|  | Composition 30 | Composition 31 | Control |
|---|---|---|---|
| No. of dead birds | 10 | 8 | 16 |
| Raising rate (Z) | 99.0 | 99.2 | 98.4 |
| Body weight at the hatch (g) | 41 | 40 | 42 |
| Eody weight at the age of 7 days (g) | 144 | 146 | 142 |
| Body weight at the age of 14 days (g) | 412 | 420 | 404 |
| Body weight gain (g) | 371 | 380 | 362 |
| Daily body weight gain (g) | 28.5 | 29.2 | 27.8 |

As Table 42 shows, the nourishing composition 30 and 31 for animals according to the present invention each decreased the number of dead birds and elevated the raising rate, compared with the control.

Test Example 12

When the temperature was high in the summer season, breeding hens aged 27 weeks were divided into 3 groups each having 1,000 birds and fed with a common feed for 6 weeks. During this period, the nourishing compositions 32 and 33 obtained in Example 12 and water (as a control) were given to the birds.

After the completion of the test, the normal egg laying rate, the individual egg weight, the daily egg weight, the feed intake, the feed conversion rate and the soft/broken egg rate were calculated in the same manner as in Test Example 3.

Tables 43 shows the results.

TABLE 43

|  | Composition 32 | Composition 33 | Control |
|---|---|---|---|
| Normal egg laying rate (%) | 87.8 | 88.8 | 87.3 |
| Individual egg weight (g) | 59.3 | 59.1 | 59.6 |
| Daily egg weight (g) | 52.1 | 52.5 | 52.0 |
| Feed intake (g) | 100.0 | 99.8 | 100.8 |
| Feed conversion rate (%) | 1.92 | 1.90 | 1.94 |
| Soft/broken egg rate (%) | 2.2 | 2.0 | 2.2 |

As Table 43 shows, the nourishing compositions 32 and 33 for animals according to the present invention each elevated the normal egg laying ratio and the daily egg weight and lowered the soft/broken egg ratio, compared with the control.

Test Example 13

Layers aged 9 weeks were divided into 2 groups each having 1,000 birds and fed with a common feed for 3 days from the day of debeaking. During this period, the nourishing composition 34 obtained in Example 13 and water (as a control) were given to the birds.

The average body weight and the number of dead birds of each group measured at the initiation of the test and at the age of 10, 11 and 12 weeks. Thus the raising rate was calculated in the same manner as in Test Example 2.

Table 44 shows the results.

TABLE 44

|  | Composition 34 | Control |
|---|---|---|
| No. of dead birds | 7 | 12 |
| Raising rate (%) | 99.3 | 98.8 |
| Body weight at the age of 9 weeks (g) | 694 | 710 |
| Body weight at the age of 10 weeks (g) | 728 | 719 |
| Body weight at the age of 11 weeks (g) | 812 | 771 |
| Body weight at the age of 12 weeks (g) | 919 | 867 |
| Body weight gain (g) | 225 | 157 |

As Table 44 shows, the nourishing composition 34 for animals according to the present invention decreased the number of dead birds and elevated the raising rate, compared with the control.

Test Example 14

Layers aged 16 weeks were divided into 2 groups each having 1,000 birds and infectious coryza vaccine was given to each bird by intramuscular injection in a predetermined dose. For 3 days from the vaccination, the nourishing composition 35 obtained in Example 14 and water (as a control) were given to the birds.

The average body weight and the number of dead birds were measured at the initiation of the test (at the age of 16 weeks) and at the age of 17 and 18 weeks. Thus the raising rate was calculated in the same manner as in Test Example 2.

Table 45 shows the results.

TABLE 45

|  | Composition 35 | Control |
| --- | --- | --- |
| No. of dead birds | 4 | 6 |
| Raising rate (%) | 99.6 | 99.4 |
| Body weight at the age of 16 weeks (g) | 1215 | 1220 |
| Body weight at the age of 17 weeks (g) | 1240 | 1235 |
| Body weight at the age of 18 weeks (g) | 1320 | 1300 |
| Body weight gain (g) | 105 | 80 |

As Table 45 shows, the nourishing composition 35 for animals according to the present invention decreased the number of dead birds and elevated the raising rate, compared with the control.

Test Example 15

Broilers aged 55 days were divided into 2 groups each having 15 birds and fasted for 8 hours before the shipment. During the fasting period, the nourishing composition 36 obtained in Example 15 and water (as a control) were given respectively to the groups. The test was carried out twice.

The average body weight of each group was measured at the initiation of the test and after the completion thereof to calculate the body weight loss. Table 46 shows the results.

TABLE 46

|  | First run | | Second run | |
| --- | --- | --- | --- | --- |
|  | Composition 36 | Control | Composition 36 | Control |
| Body weight at the initiation of the test (g) | 2728.7 | 2763.3 | 3106.9 | 3138.0 |
| Body weight at the completion of the test (g) | 2693.3 | 2698.0 | 3066.7 | 3064.3 |
| Body weight loss (g) | 35.4 | 65.3 | 39.3 | 73.7 |
| Body weight loss (%) | 1.30 | 2.36 | 1.27 | 2.34 |

As Table 46 shows, the nourishing composition 36 for animals according to the present invention suppressed the body weight loss, compared with the control.

Test Example 16

Broilers aged 28 days were divided into 2 groups each having 30,000 birds and the nourishing composition 37 obtained in Example 16 and water (as a control) were given to the birds for 5 days after the change of the feed and the administration of vaccine. The same test items as in Test Example 2 were evaluated.

Table 47 shows the results.

TABLE 47

|  | Composition 37 | Control |
| --- | --- | --- |
| No. of missing birds | 2401 | 3059 |
| Raising rate (%) | 92.60 | 90.57 |
| Total body weight at the time of shipment (kg) | 78658 | 75825 |
| Individual body weight (g) | 2617 | 2580 |
| Daily body weight gain (g) | 46.51 | 45.79 |
| Feed conversion rate (%) | 2.259 | 2.328 |
| PS | 190.64 | 178.16 |

As Table 47 shows, the nourishing composition 37 for animals according to the present invention decreased the number of missing birds and elevated productivity, compared with the control.

Test Example 17

Layer chicks aged 47 days were divided into 2 groups each having 2,500 birds and then transferred to the brooding house. After three days of the transfer, the nourishing composition 37 for animals obtained in Example 16 and water as a control were administered to the birds.

Table 48 shows the results.

TABLE 48

|  | Composition 37 | Control |
| --- | --- | --- |
| Body weight at the initiation of the test (g) | 398 | 408 |
| Body weight 4 weeks after the initiation of the test (g) | 815 | 808 |
| Body weight gain (g) | 417 | 400 |
| Body weight gain (%) | 104.8 | 98.2 |

As Table 48 shows, the nourishing composition 37 for animals according to the present invention enhanced the growth of layer chicks, compared with the control.

Test Example 18

Layer chicks aged 109 days were divided into 2 groups each having 2,500 birds. The nourishing composition 37 for animals obtained in Example 16 and water (as a control) were given to the birds for 3 days after the administration of vaccine.

Table 49 shows the results.

TABLE 49

|  | Composition 37 | Control |
| --- | --- | --- |
| Body weight at the initiation of the test (g) | 1100 | 1138 |
| Body weight 4 weeks after the initiation of the test (g) | 1330 | 1318 |

TABLE 49-continued

|  | Composition 37 | Control |
| --- | --- | --- |
| Body weight gain (g) | 230 | 180 |
| Body weight gain (%) | 20.9 | 15.8 |

As Table 49 shows, the nourishing composition 37 for animals according to the present invention enhanced the growth of layer chicks, compared with the control.

Test Example 19

Layer chicks aged 68 days were divided into 2 groups each having 1,700 birds. The nourishing composition 37 obtained in Example 16 and water (as a control) were given to the birds for 2 days after debeaking.

Table 50 shows the results.

TABLE 50

|  | Composition 37 | Control |
| --- | --- | --- |
| Body weight at the initiation of the test (g) | 694.0 | 710.2 |
| Body weight 1 week after the initiation of the test (g) | 727.6 | 719.4 |
| Body weight gain (g) | 33.6 | 9.2 |
| Body weight gain (%) | 48.4 | 1.3 |

As Table 50 shows, the nourishing composition 37 for animals according to the present invention enhanced the growth of layer chicks, compared with the control.

Test Example 20

Layers aged 484 days were divided into 2 groups each having 5,000 birds and fed with the nourishing composition 38 obtained in Example 17 and water (as a control) for 12 days from the 17th day after forced moulting.

Table 51 shows the results.

TABLE 51

|  | Composition 38 | Control |
| --- | --- | --- |
| Body weight at the age of 40 days after moulting (g) | 1598 | 1454 |
| Egg laying rate at the age of 40 days after moulting (%) | 25.0 | 7.8 |
| Egg laying rate at the age of 60 days after moulting (g) | 81.7 | 67.8 |

As Table 51 shows, the nourishing composition 38 for animals according to the present invention enhanced the growth of layers and egg laying rate after forced moulting, compared with the control.

Test Example 21

Using the nourishing composition 38 obtained in Example 17, the test was carried out in the same manner as in Test Example 3.

Tables 52 and 53 shows the results.

TABLE 52

|  | Composition 38 | Control |
| --- | --- | --- |
| Normal egg laying rate (%) | 88.0 | 87.5 |
| Individual egg weight (g) | 59.4 | 59.5 |
| Daily egg weight (g) | 52.2 | 52.3 |
| Feed intake (g) | 95 | 98 |
| Feed conversion rate (%) | 1.82 | 1.87 |
| Soft/broken egg rate (%) | 1.5 | 2.1 |

TABLE 53

|  | Composition 38 | Control |
| --- | --- | --- |
| Dense albumen height (mm) | 5.56 | 5.56 |
| Yolk diameter (cm) | 4.10 | 4.09 |
| HU | 71.6 | 71.3 |

As Tables 52 and 53 show, the nourishing composition 38 for animals according to the present invention elevated the normal egg laying rate and the daily egg weight and lowered the soft/broken egg rate, compared with the control.

As the results of the examination on the egg qualities, it was found that the nourishing composition 38 of the present invention elevated the dense albumen height, the yolk diameter and HU.

Test Example 22

Layer chicks aged 6 days were divided into 2 groups each having 30,000 birds and the nourishing composition 39 obtained in Example 18 and water (as a control) were given to the birds for 3 days from the day of the initiation of feeding.

Table 54 shows the results.

TABLE 54

|  | Composition 39 | Control |
| --- | --- | --- |
| Body weight at the initiation of the test (g) | 72.2 | 71.6 |
| Body weight at the age of 2 weeks (g) | 134.6 | 129.0 |
| Body weight at the age of 3 weeks (g) | 209.9 | 199.0 |
| Dody weight at the age of 4 weeks (g) | 292.0 | 280.5 |
| Body weight at the age of 5 weeks (g) | 384.4 | 355.0 |

As Table 54 shows, the nourishing composition 39 for animals according to the present invention enhanced the growth of layer chicks, compared with the control.

Test Example 23

Using the nourishing composition 40 obtained in Example 19, the test was carried out in the same manner as in Test Example 8.

Table 55 shows the results.

TABLE 55

|  | Composition 40 | Control |
|---|---|---|
| Body weight at the initiation of the test (kg) | 115.3 | 115.8 |
| Body weight at the completion of the test (kg) | 114.2 | 104.3 |
| Body weight loss (kg) | 1.1 | 2.5 |
| Body weight loss (%) | 0.95 | 2.16 |

As Table 55 shows, the nourishing composition 40 for animals according to the present invention decreased body weight loss, compared with the control.

When the aqueous nourishing composition of the present invention is given to commonly fed animals, which lose their appetite by stress, as a drink, efficient nourishment can be achieved and various unfavorable conditions, such as stagnation in body weight gain, reduction of egg laying performance or decrease in egg shell strength, can be remarkably improved.

While the invention has been described in detail and with reference to specific examples thereof, it will be apparent to one skilled in the art that various changes and modifications can be made therein without departing from the spirit and scope thereof.

What is claimed is:

1. A process of preparing a nourishing composition for animals consisting essentially of powdered amino acids and dextrin, which process consists essentially of mixing together (a) powdered amino acids comprising lysine having a particle size of from 1.0 to 500 μm, methionine having a particle size of from 1.0 to 200 μm, tryptophan having a particle size of from 1.0 to 200 μm, threonine having a particle size of from 1.0 to 500 μm and glycine having a particle size of from 1.0 to 500 μm, and (b) dextrin, having a degree of polymerization of from 5 to 25, to form a nourishing composition which is devoid of sugar and wherein the ratio of dextrin to amino acid mixture in the thus prepared composition ranges from 8:1 to 1:8.

2. The process of claim 1 wherein the amount of dextrin in the (a)+(b) mixture ranges from 0.001 to 0.8% by weight.

3. A process of preparing a nourishing composition for animals consisting essentially of powdered amino acids and dextrin, which process consists essentially of the steps of:

(1) mixing together (a) powdered amino acids comprising lysine having a particle size of from 1.0 to 500 μm, methionine having a particle size of from 1.0 to 200 μm, tryptophan having a particle size of from 1.0 to 200 μm, threonine having a particle size of from 1.0 to 500 μm and glycine having a particle size of from 1.0 to 500 μm, and (b) dextrin having a degree of polymerization of from 5 to 25, and (2) diluting the mixture formed in step (1) with water to form an aqueous nourishing solution which is devoid of sugar and wherein the ratio of dextrin to amino acid mixture in the thus prepared solution ranges from 8:1 to 1:8.

4. The process of claim 3 wherein the amount of dextrin in the (a)+(b) mixture ranges from 0.001 to 0.8% by weight.

5. The process of claim 3 wherein the amount of water added in step (2) is from 10 to 7,000 times the weight of the mixture of step (a).

* * * * *